Oct. 16, 1928.  
W. WHEELER  
1,688,218

INTERNAL COMBUSTION ENGINE

Filed Feb. 11, 1924  2 Sheets-Sheet 1

INVENTOR  
William Wheeler  
BY  
Frederick W. Barker  
ATTORNEY

Oct. 16, 1928.
W. WHEELER
INTERNAL COMBUSTION ENGINE
Filed Feb. 11, 1924
1,688,218
2 Sheets-Sheet 2
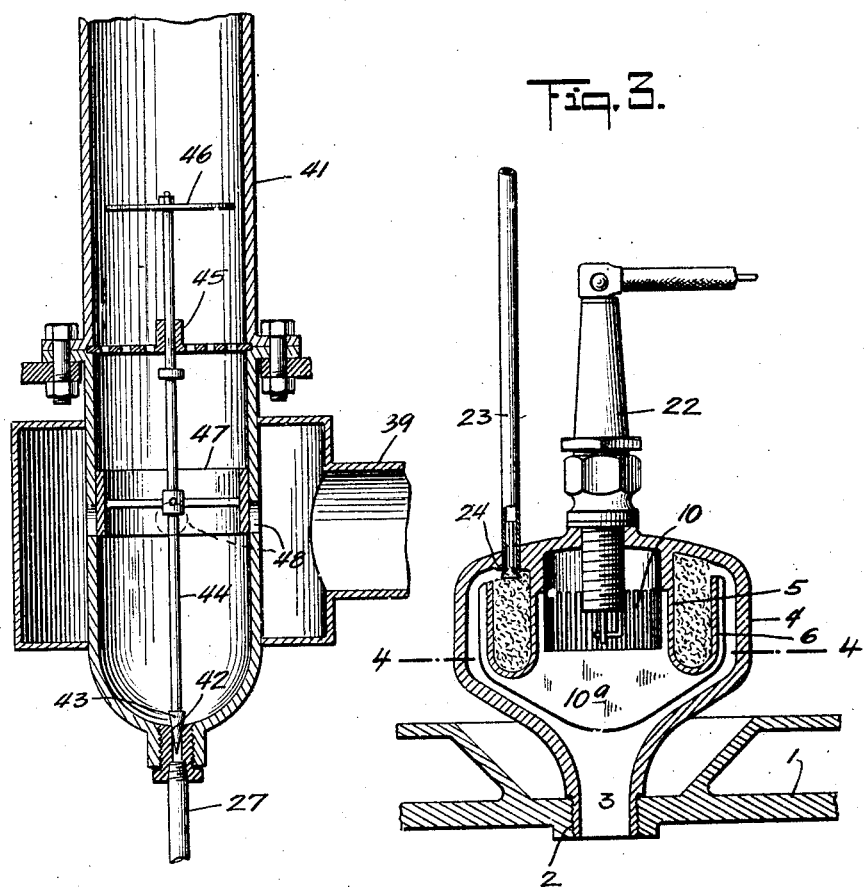
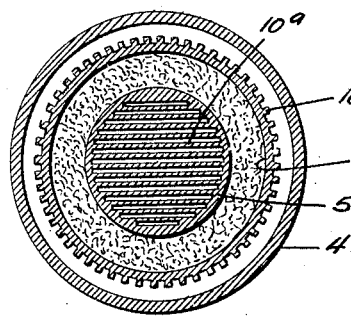
INVENTOR
William Wheeler
BY
Frederick W Barker
ATTORNEY Patented Oct. 16, 1928.

1,688,218

UNITED STATES PATENT OFFICE.

WILLIAM WHEELER, OF BROOKLYN, NEW YORK.

INTERNAL-COMBUSTION ENGINE.

Application filed February 11, 1924. Serial No. 691,929.

This invention relates to internal combustion engines, this application being in part a continuation of my earlier application, Serial No. 647,416, filed June 25, 1923, whereof my present improvements are a development.

The idea of introducing the fuel directly into the spark plug chamber is employed in this application as in my said earlier application, but also I provide in conjunction therewith a superimposed receptacle for fuel, with novel means for feeding the fuel to the interior of the spark plug chamber.

Also I provide an annular trough in the spark plug chamber which may be filled with an absorbent material, like asbestos, and I provide a supply of moisture in the form of steam for this trough with means for its entry into the combustion area of the spark plug chamber.

Also I provide for the generation of steam by utilizing the engine suction to draw water from a container through a pipe which extends in the form of a coil through the exhaust manifold, said pipe terminating in a nozzle that is introduced into the annular trough aforesaid.

Still further I provide a perforated cage, adapted to fit removably within the superposed fuel receptacle, to contain calcium carbide, and I provide a supply of water to coact with the calcium carbide and generate acetylene gas for use as a power medium.

Still further I provide means for the introduction of liquid fuel directly into the spark plug chamber in addition to or to be employed instead of the fuel supply means provided by the superimposed receptacle.

Another feature of my invention consists in filling the interior of the spark plug chamber with a large number of thin plates or fins, separated very slightly apart to afford extensive areas of heat absorbing and radiating surface, having found by this means that a very high state of combustion is available.

Still another feature of my invention consists in the provision of a smoke box which encloses a section of the exhaust pipe, between the exhaust manifold and muffler. This enclosed section of the exhaust pipe is perforated, in order that some of the products of combustion, especially when the engine is idling or running at slow speed, with imperfect combustion may issue into the smoke box, and it is my purpose to re-introduce these products into the engine cylinders. To this end a pipe of relatively small diameter extends from the smoke box into an air supply pipe which communicates with the intake manifold, and in this manner the aspiratory operation of the engine serves to draw into the cylinders, along with its air supply, a quota of the hot, partially consumed products of previous combustion, thereby aiding the new combustion and effecting fuel economy by completely burning the fuel in this secondary operation. While, in one form of my invention the fuel may be introduced into the cylinder through the spark plug chamber, I may also provide for the fuel supply to be introduced into the cylinders from the intake manifold, but without the use of the ordinary types of carburetors.

Thus I may provide a cylinder having in its base a valve seat with which a needle valve is engaged, said valve having a vertical stem that is suitably guided and carries a disk that is disposed clearingly within the cylinder to be subject to the suction pull of the engine for lifting the valve, so that fuel may be drawn into the manifold. This valve stem may also carry a sleeve valve that controls air ports, the valve being adapted to open the air ports for the admission of air proportionately to the quantity of fuel admitted.

Other features and advantages of my invention will hereinafter appear:

In the drawings:—

Fig. 3 is a side sectional view of a modified form of spark plug chamber.

Fig. 4 is a section on the line 4—4 of Fig. 3, and

Fig. 5 is a side sectional detail view of novel means for supplying liquid fuel and air to the intake manifold.

Figure 1:
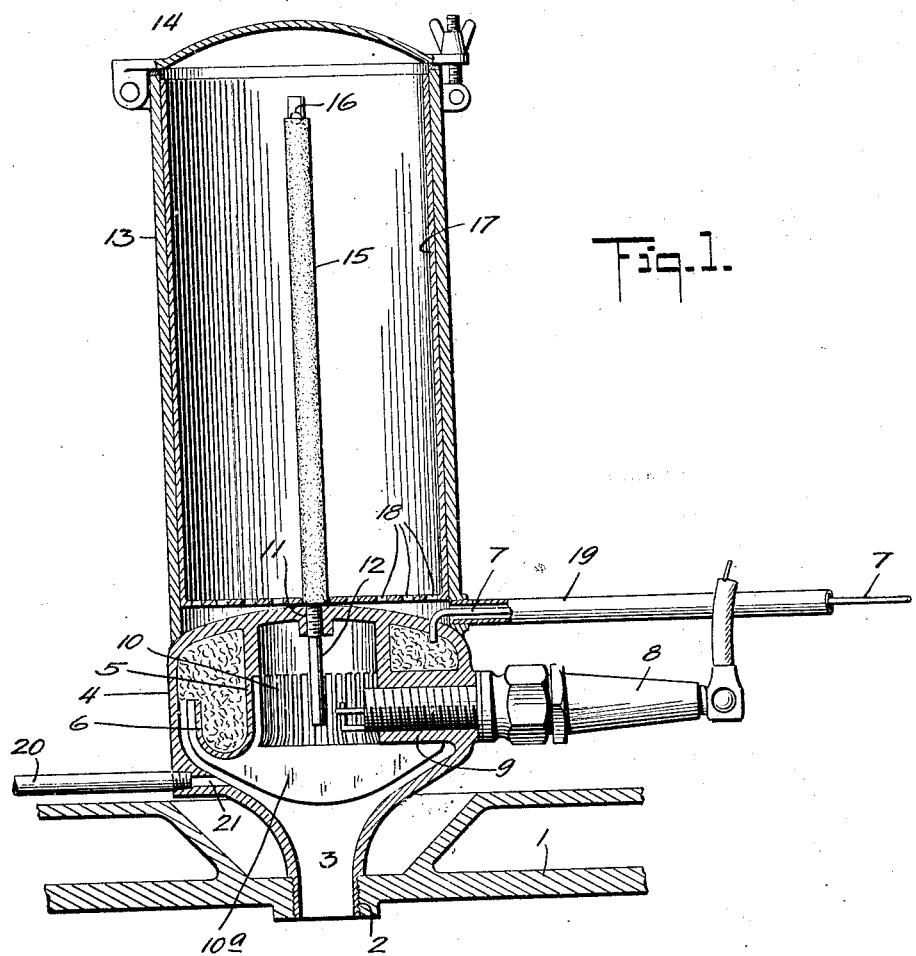
Figure 1 is a side sectional view showing a portion of a cylinder head with my improved spark plug chamber fitted therein and a fuel container superimposed upon said chamber.

First describing the features of my invention shown in Fig. 1, let 1 indicate a cylinder head, having the usual spark plug orifice 2 into which is fitted one form of my improved spark plug chamber, which is shown as having the open neck portion 3, and hollow, head portion 4, the neck portion serving as means of communication between the interior of the head portion 4 and the interior of the cylinder. Depending from the top head portion 4 is an inner annular wall 5, that continues into an outward, trough-like formation 6, whose outer wall is in spaced relation to the outer wall of the head portion 4. This trough-like formation serves to contain absorbent material, such as asbestos, which may be supplied with moisture as through a pipe 7, the moisture in the form of steam passing between the walls of head portion 4 and trough 6 to the interior of the spark plug chamber, to promote combustion and be consumed there with fuel that is also introduced into said spark plug chamber.

The spark plug, 8 is introduced laterally into chamber head 4 through a sleeve 9 that is provided therein, the spark points being located centrally of said head. The inner surface of wall 5 and the outer surface of its trough-like formation 6, are provided with a series of ribs 10 that enlarge its head absorbing and radiating area, and the lower portion of the head interior, above the neck portion 3, contains a series of thin plates or fins 10ª which are continuations of some of ribs 10, spaced apart in close proximity to each other, to greatly add to the heat absorbing and radiating surface area within the head 4. In this manner a zone of intense heat is created within the centre of the head 4, into which the spark points extend. Entered axially into this heat zone, through an orifice 11 in the top of head 4, is a fuel supply pipe 12, whose nozzle exit lies in close proximity to the spark points. This pipe 12 extends upwardly within a fuel container 13, that is superimposed upon the head 4, and is closed at its upper end with a dome shaped cover 14. The pipe 12, within container 13, is covered with a coating 15 of absorbent material, like asbestos, which extends up to and over an opening 16 at or near the top of said pipe, to convey liquid within container 13, by capillary attraction, upwardly to said opening 16, that it may there enter the pipe 12 to flow downwardly therethrough for delivery into the interior of head 4. The fuel employed may be gasoline, kerosene, or heavier oils or fats which will become vaporized by the heat communicated to container 13 from the head 4.

In some instances, when the engine is to be run on fuel otherwise supplied, the container 13 may be charged with gasoline for priming purposes; or, if desired, acetylene may be employed for priming. In this latter instance calcium carbide may be placed in the removable cage 17, which has a perforated base 18, and can be fitted in container 13. A small quantity of water, introduced into the cage through a pipe 19, will become vaporized and react with the calcium carbide to generate the amount of acetylene needed to prime the engine for starting up purposes.

Then, the operating liquid fuel, of any desirable character, can be supplied to the spark plug chamber through a pipe 20, which is entered laterally through an orifice 21 provided in the wall of said chamber.

In some instances liquid fuel may be supplied to the cylinder through the usual intake manifold, and then the spark plug chamber may be modified as indicated in Fig. 3, wherein the general characteristics of said chamber correspond with the showing in Fig. 1, and bear the same reference characters. Hence the cross-sectional view of Fig. 4 will be found to apply equally to both Figs. 1 and 3. The points of difference between the showings in Figs. 1 and 3 are that in Fig. 3 the spark plug 22 is entered axially therein and this spark plug chamber has no means for the supply of liquid fuel directly thereinto. However, steam is introduced into the absorbent material in trough 6 from above, by a pipe 23, whose exit end is guarded by a valve 24 that may be held normally closed by pressure against the absorbent material, which is packed tightly in trough 6, the valve opening under steam pressure in the pipe.

Figure 2:
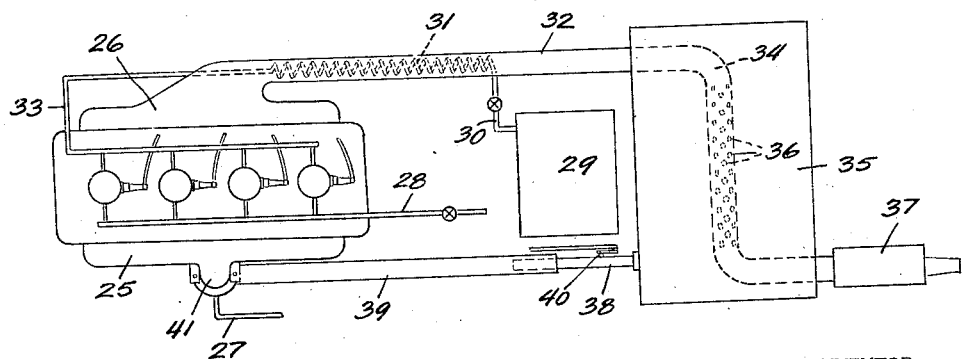
Fig. 2 is a top plan view of an internal combustion engine, including certain features of my invention.

I have shown in Fig. 2 a diagrammatic plan view of an engine having the usual intake manifold 25 and exhaust manifold 26. Also a fuel pipe 27 leading to the intake manifold, and a main fuel supply pipe 28 to connect with the branch pipes 20 that communicate with the respective spark plug chambers of which that shown in Fig. 1 is an example.

Also I have shown in Fig. 2 a water tank 29, from which a pipe 30 extends to supply the spark plug chambers with steam. Said pipe 30 is carried in the form of a coil 31 through exhaust pipe 32 in order that the water flowing therethrough may be converted into steam, and said pipe continues outside the exhaust manifold as an extension 33 of the coil to connect with branches 7 or 23, accordingly as to whether the form of the spark plug chamber shown in either Fig. 1 or Fig. 3 is employed. It will be appreciated that the aspiratory operation of the engine is responsible in creating the vacuum which causes the water in tank 29 to flow through the coil.

It will further be seen, in Fig. 2 that I have enclosed a section 34 of the exhaust pipe in a closed box 35, that section 34 being provided with perforations 36 in its wall, and lying between and manifold and the muffler 37. This box 35 is intended to receive, through perforations 36, some portion of the exhaust gases or partially burned products, which, particularly when the engine is idling, or running at slow speed, will discharge into said box, it being my purpose to provide means for re-introducing such products into the cylinders by way of the intake manifold.

Therefore I provide an open pipe 38, leading from box 35, and entered clearingly into an air supply pipe 39 of larger diameter, which communicates with the intake manifold. By these means the contents of box 35 will be drawn into the intake manifold along with fresh air, and materially aid the combustible nature of the engine charges, besides economizing the fuel and preventing the exhaust to the atmosphere of unconsumed gases or carbon monoxide. The pipe 38 may be controlled by a valve 40.

A further feature of invention comprised in this application consists of means of liquid fuel supply to the intake manifold without the use of carburetor. Thus, in Fig. 5 I have shown a cylinder 41 having a fuel inlet orifice in its lower part with a valve seat 42, and a needle valve 43 engaging said seat. The valve stem 44 extends up through a guide 45, and carries a disk 46 which lies transversely of cylinder 41, in spaced relation to its wall, so that said disk, while responsive to the vacuum in the manifold to lift the valve, permits fuel to pass between it and the cylinder wall. Also said stem 44 carries a sleeve valve 47, which controls air ports 48, that may be supplied with air through pipe 39, and thus may also receive along with fresh air, the hot products from box 29.

Variations within the spirit and scope of my invention are equally comprehended by the foregoing disclosure:

I claim:

1. The combination, with an internal combustion engine, of an auxiliary chamber in communication therewith, moisture reception and collecting means located within and open to said chamber, and means for supporting a spark plug with its sparking points located within said chamber.

2. The combination, with an internal combustion engine, of an auxiliary chamber in communication therewith, said chamber containing a large number of vertically disposed heat radiating plates, in closely adjacent spaced relation, and means for supporting a spark plug with its sparking points located within said chamber.

3. The combination, with an internal combustion engine, of an auxiliary chamber in communication therewith, moisture reception and collecting means located within and open to said chamber, moisture delivery means for said reception means, and means for supporting a spark plug with its sparking points located within said chamber.

4. The combination, with an internal combustion engine, of an auxiliary chamber in communication therewith, an annular trough within and open to the interior of said chamber, said trough filled with absorbent material, means for delivering moisture to said trough, and means for supporting a spark plug with its sparking points located within said chamber.

5. The combination, with an internal combustion engine, of an auxiliary chamber in communication therewith, means for supporting a spark plug with its sparking points located within said chamber, a fuel container superimposed upon said chamber, a fuel delivery pipe extending upwardly within said container and continuing downwardly to the interior of said chamber, and a covering of absorbent material for said pipe to convey liquid fuel by capillary attraction to the upper open end of said pipe, for delivery through said pipe by gravity to the interior of said chamber.

6. The combination, with an internal combustion engine, of an auxiliary chamber in communication therewith, means for supporting a spark plug with its sparking points located within said chamber, a fuel container superimposed upon said chamber, moisture reception and collecting means located within and open to said chamber, a perforated basket to contain calcium carbide removably fitted within said container, means for admitting moisture to the calcium carbide, to create a starting charge of acetylene, and means of communication between the container and the chamber interior.

7. The combination, with an internal combustion engine, of an auxiliary chamber in communication therewith, moisture reception and collection means located within and open to said chamber, means of supporting a spark plug with its sparking points located within said chamber, and means for the delivery of liquid fuel directly into said chamber.

Executed this 7th day of February, 1924.

WILLIAM WHEELER.